United States Patent
Taylor

(10) Patent No.: US 6,398,240 B1
(45) Date of Patent: Jun. 4, 2002

(54) VEHICLE-LOWERING STEERING KNUCKLE FOR "LIVE" WHEEL HUB

(75) Inventor: Robert A. Taylor, Fresno, CA (US)

(73) Assignee: Belltech, Inc., Fresno, CA (US)

( * ) Notice: Subject to any disclaimer, the term of this patent is extended or adjusted under 35 U.S.C. 154(b) by 0 days.

(21) Appl. No.: 09/430,520

(22) Filed: Oct. 29, 1999

(51) Int. Cl.⁷ .............................................. B62D 7/18
(52) U.S. Cl. ........................... 280/93.512; 280/93.511
(58) Field of Search ....................... 280/93.512, 93.511

(56) References Cited

U.S. PATENT DOCUMENTS

| | | | | |
|---|---|---|---|---|
| 3,908,480 A | * | 9/1975 | Afanador et al. | 74/511 R |
| 4,618,159 A | * | 10/1986 | Kozyra et al. | 280/93 |
| 4,674,760 A | * | 6/1987 | Goulart | 280/88 |
| 4,722,540 A | * | 2/1988 | Kozyra et al. | 280/93 |
| 5,199,730 A | * | 4/1993 | Westfall et al. | 280/96.1 |
| 5,219,176 A | * | 6/1993 | Mitchell | 280/93.512 |
| 5,435,590 A | * | 7/1995 | Larsson | 280/673 |
| 5,975,547 A | * | 11/1999 | Stroh et al. | 280/93.512 |
| 6,099,003 A | * | 8/2000 | Olszewski et al. | 280/93.512 |
| 6,179,308 B1 | * | 1/2001 | Mielauskas et al. | 280/93.512 |

OTHER PUBLICATIONS

Belltech 1997 Sport Truck Products Catalog.
Truckin' Magazine, Oct. 1998 (advertisements, etc.).
Dan Sanchez, Lowering Your Chevy With Dropped Spindles. Oct. 1998 Truckin' Magazine, pp. 130–133.
Bob Ryder, The C–Section Eliminator. Oct., 1998 Truckin' Magazine, pp. 226–266.
Truckin' Magazine, Oct. 1999 (advertisements, etc.).
Randall Jachmann, "Maximum Articulation" Oct. 1999 Truckin' Magazine, pp. 227–231.
Truckin' Magazine, Jul. 1999 (advertisements, etc.).
Kevin Wilson, "Getting the Drop on Our Project Ford" Truckin' Magazine, Jul. 1999, pp. 166–176.
Randall Jachmann, "Phase One: A Belltech 4–6 drop" Truckin' Magazine, Jul. 1999, pp. 194–198.

* cited by examiner

*Primary Examiner*—Brian L. Johnson
*Assistant Examiner*—Deanna Draper
(74) *Attorney, Agent, or Firm*—Mark D. Miller

(57) ABSTRACT

The present invention is an after-market vehicle-lowering steering knuckle (drop spindle) designed for use with a large-bore "live" wheel hub to lower a vehicle chassis. This is accomplished through the inversion and modification of the upper and lower ball joints as compared to a factory steering knuckle, and a modification of the bolt assembly for attaching the wheel hub assembly to the spindle. The present invention allows the factory-supplied upper and lower control arms to be used, providing a considerable cost savings to the end user. The drop spindle design described herein may also be used to lower four-wheel drive trucks.

24 Claims, 14 Drawing Sheets

VEHICLE-LOWERING STEERING KNUCKLE FOR "LIVE" WHEEL HUB

BACKGROUND OF THE INVENTION

1. Field of the Invention

The present invention relates to after-market vehicle-lowering steering knuckles (drop spindles), and more particularly to a newly designed drop spindle which is capable of supporting a large-bore "live" wheel hub and which can be used to lower a vehicle chassis.

2. Description of the Prior Art

A typical spindle (or steering knuckle) is a component of the front suspension of a vehicle, which attaches the wheel and brake assemblies to the vehicle, and allows the wheels to travel vertically (oust and rebound), turn, and rotate. The most common spindle bodies are of a cast metal configuration utilizing a press fit, metallic, machined, cylindrical shaft called a spindle pin to which the wheel bearings, brake components, and wheel are affixed. In particular, a wheel hub fits over the elongated spindle pin with bearing surfaces actually making contact with the pin. A vehicle wheel is, in turn, attached to the hub. This common type of pin and hub assembly is sometimes referred to in the industry as a "dead hub".

For aesthetic purposes and for improved handling, it is common to lower the chassis of a vehicle closer to the ground by vertically repositioning the elongated spindle pin, steering arm and brake attachment features on the steering knuckle assembly. In this regard, numerous vehicle lowering steering knuckles (commonly known as "drop" spindles) have been developed in which the position of the spindle pin shaft has been vertically changed relative to the steering knuckle body, thereby raising the position of the vehicle wheels relative to the chassis which lowers the chassis closer to the ground. This is possible because most drop spindle bodies are large enough that there is considerable space within the body, often several inches, where the position of the elongated spindle pin can be established without affecting performance.

For a variety of reasons, the manufacturers of several light trucks have recently changed the design of the steering knuckles used on these vehicles to accommodate a different kind of wheel hub assembly. This has resulted in the replacement of the common spindle pin assembly with a much larger front spindle design which takes up virtually all of the space in the steering knuckle that was previously used to move the spindle pin in order to lower the vehicle.

In particular, in order to lower manufacturing costs, several new two-wheel (rear) drive (2WD) model trucks now utilize the same front spindle (cast) bodies as the fourwheel drive (4WD) models. The spindle bodies used for 4WD trucks usually incorporate some type of rotating joint assemblies, such as constant velocity (CV) joints, which allow the drive axles to move vertically with the front suspension while rotating. These rotating joints are typically attached to the spindle body by way of roller bearings. The drive axles are then attached to the brake and wheel assemblies through the use of wheel hubs and flanges.

However, the 2WD trucks do not incorporate these 4WD components. Instead, in 2WD trucks the manufacturers have recently, while using a common steering knuckle body, replaced the 4WD drive axle and CV Joint assemblies with bolt-in "live" spindle hubs to which the brake and wheel assemblies are attached. The term "live" hub implies that the hub assembly, to which the brake and wheel assemblies are attached, is made up of a short shaft that rotates within, and is affixed to roller bearings that are mounted within the hub bearing housing.

The hub bearing housing, in turn, is attached into the spindle body. This "live" hub simulates, and takes the place of the drive axle and rotating CV joint components of the 4WD models.

Significantly, the bolt-in "live" hub assembly requires a much larger bore diameter to be placed within the steering knuckle body, than that previously required for ae press-fit spindle pin. In addition, the bolts that attach the hub assembly to the spindle body have a set pattern which must be accommodated for. The large bore and the bolt-pattern require much more space than the press-in spindle pin designs. These differences in the design of these recent factory steering knuckles have taken away virtually all of the space previously available to accomplish the vehicle lowering function using existing drop spindle designs. Accordingly, it has heretofore not been considered possible to design after-market vehicle lowering drop spindles for such vehicles.

SUMMARY OF THE INVENTION

The present invention is a vehicle-lowering steering knuckle (drop spindle) designed for use with a large-bore "live" wheel hub to lower, a vehicle chassis. This is accomplished through the inversion and modification of the upper and lower ball joints on the factory steering knuckle, and a modification of the bolt assembly for attaching the wheel hub) assembly to the spindle. It is to be noted that the spindle design described herein may also be used to lower four-wheel drive trucks.

The recent factory steering knuckles for supporting "live" hubs include a lower ball-joint for attachment to a lower control arm, and an upper ball joint for attachment to an upper control arm of the vehicle. In the present invention, the lower ball-joint orientation is physically reversed, within the lower control arm, such that the factory-designed previously downward-facing stud faces upwards at a suitable angle in the present invention. The factory designed lower ball-joint is replaced with a new ball-joint specifically designed to be loaded in this new direction. The stud of the ball-joint is supported by a tab that is cast into the spindle body. The position of the tab is modified in the present invention, by being elevated relative to the "live" hub spindle centerline, and by being angularly oriented to receive the inverted ball joint stud. The inversion of the stud moves the ball attached thereto from above the tab to below it. The distance between the prior location of the ball-joint in the factory spindle (above the tab) and the position of the ball-joint in the present invention (below the tab) defines the amount by which the vehicle can be lowered using the present invention. The present invention raises the vehicle wheel position relative to the lower control arm, lowering the vehicle height by that same amount, relative to the ground. The new lower ball-joint tab configuration of the present invention is particularly effective in that it accomplishes the lowering of the vehicle within the limited space parameters of the recent factory "live" hub spindle designs.

The lower ball-joint housing has also been modified from the factory-designed compression structure to a new tension structure. In the factory design, the lower ball-joint was located above the tab, and a ball joint housing was fitted over it. This housing was attached to the lower control arm, and transmitted much of the weight of the vehicle to the spindle, thereby compressing the housing against the spherical faces of ball and socket joint. In the present invention, the lower ball-joint is located below the tab, and a modified housing is fitted around the ball. The housing is attached to the lower control arm, and transmits the weight of the vehicle to the spindle, thereby causing a pulling tension between housing and the ball joint.

The upper (follower) ball-joint is also inverted in the present invention. In order to maintain proper swing-angles, the factory supplied upper control arm is reversed so that the previously downward facing ball-joint stud is now reoriented upward. Proper ball-joint swing angles are defined such that, at normal static ride height, the suspension ball-joints are in a neutral position, allowing them maximum travel in both directions of suspension travel (joust and rebound). The factory-designed upper control arm is symmetrical, front-to back, allowing for such a reversed orientation. Because of this reorientation, the upper ball-joint tab, which i, cast into the spindle body, must also be reversed to receive the reoriented ball-joint stud. This reorientation is designed so as to provide the necessary strength of the casted spindle body, and to make possible the various machining operations, which are required to fasten the upper control arm ball-joint to the spindle body. Maintaining proper upper ball-joint swing-angles has always been a major obstacle in the design of after-market vehicle-lowering spindles. The present invention overcomes this difficult problem.

The ball of the inverted upper ball-joint of the present invention has been brought from a position above the upper tab to a position below said tab that is in close proximity with one of the bolt holes used for attaching the "live" hub assembly to the spindle body. In order to provide space for and to accommodate the new position of the upper ball joint and upper control arm, this bolt hole is counter bored in the present invention. The hut) assembly is then attached to the spindle body using a socket head fastener at this position.

It is therefore a primary object of the present invention to provide a vehicle-lowering steering knuckle (drop spindle) for use with "live" wheel hub assemblies.

It is also an important object of the present invention to provide an after-market drop spindle for lowering the chassis of a vehicle equipped with "live" wheel hub assemblies.

It is a further object of the present invention to provide a simple after-market drop spindle for lowering the chassis of a vehicle that is equipped with "live" wheel hub assemblies which drop spindle is capable of utilizing the factory provided upper and lower control arms.

It is another object of the present invention to provide a drop spindle apparatus for lowering the chassis of a vehicle equipped with a wheel hub assembly to which the brake and wheel assemblies are attached, said hub assembly being made up of a short shaft that rotates within, and is affixed to roller bearings that are mounted within the hub housing, which housing is, in turn, attached to the drop spindle body, the drop spindle also being capable of utilizing the factory provided upper and lower control arms.

Other objects of the invention will be apparent from the detailed descriptions and the claims herein.

DETAILED DESCRIPTION OF THE DRAWINGS

Figure 1:
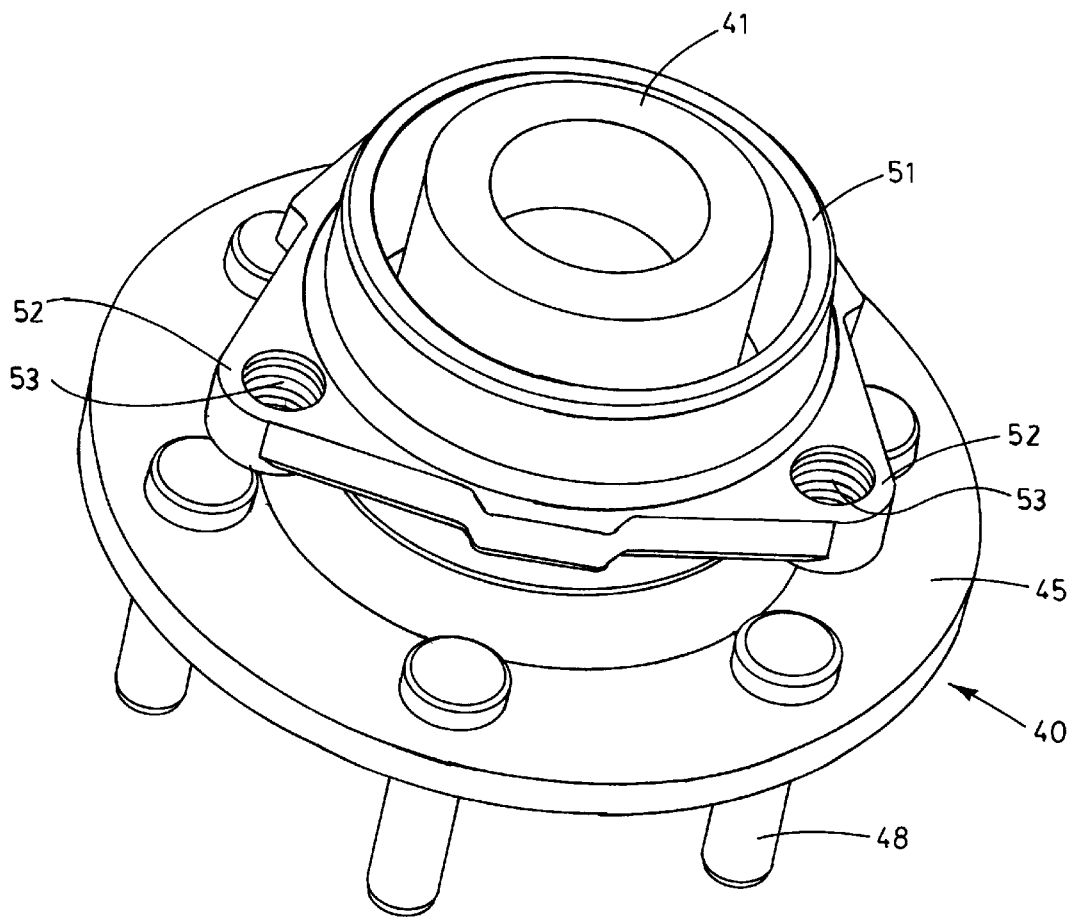
FIG. 1 is a perspective view of a "live" wheel hub assembly.
Figure 2:
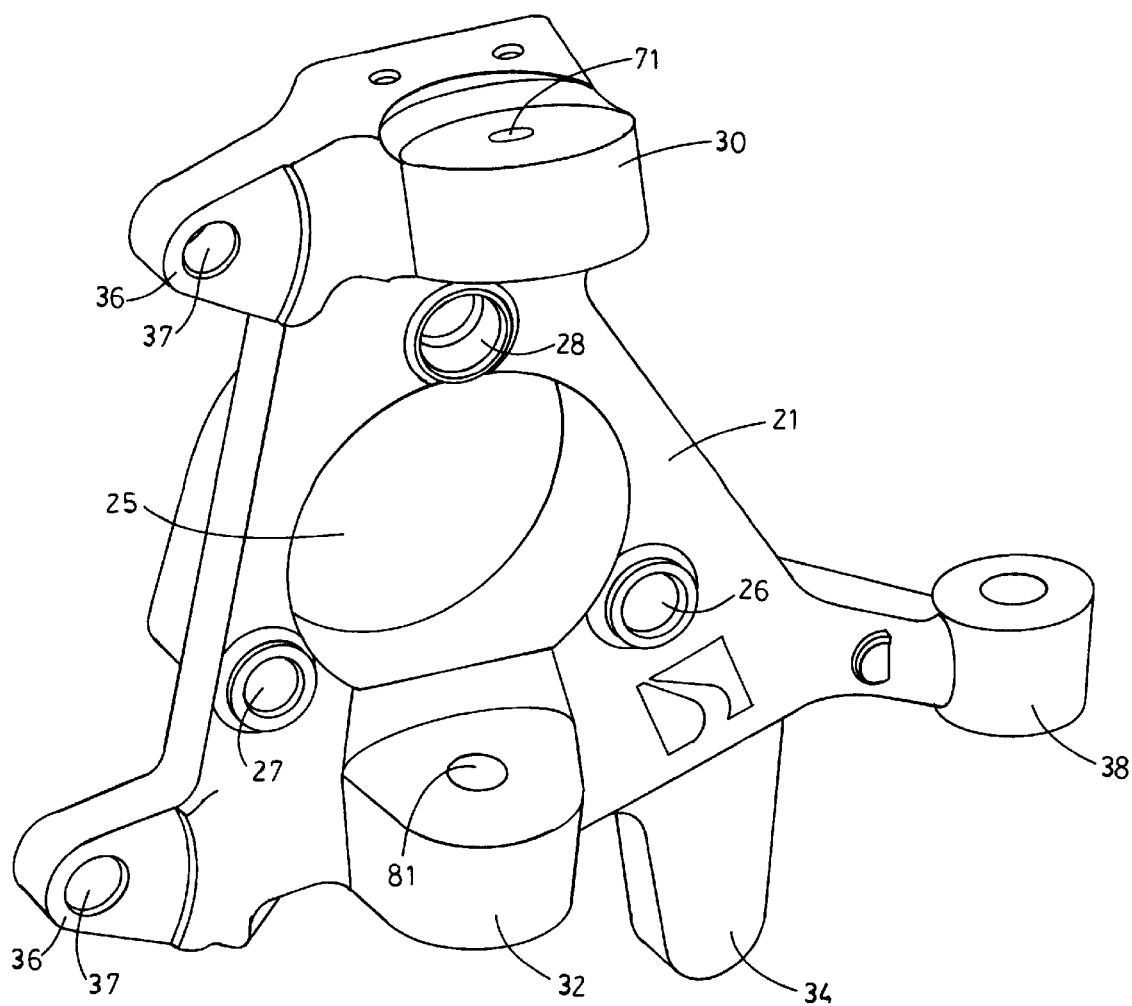
FIG. 2 is an inside isometric view of the steering knuckle (drop spindle) body of the present invention.
Figure 3:
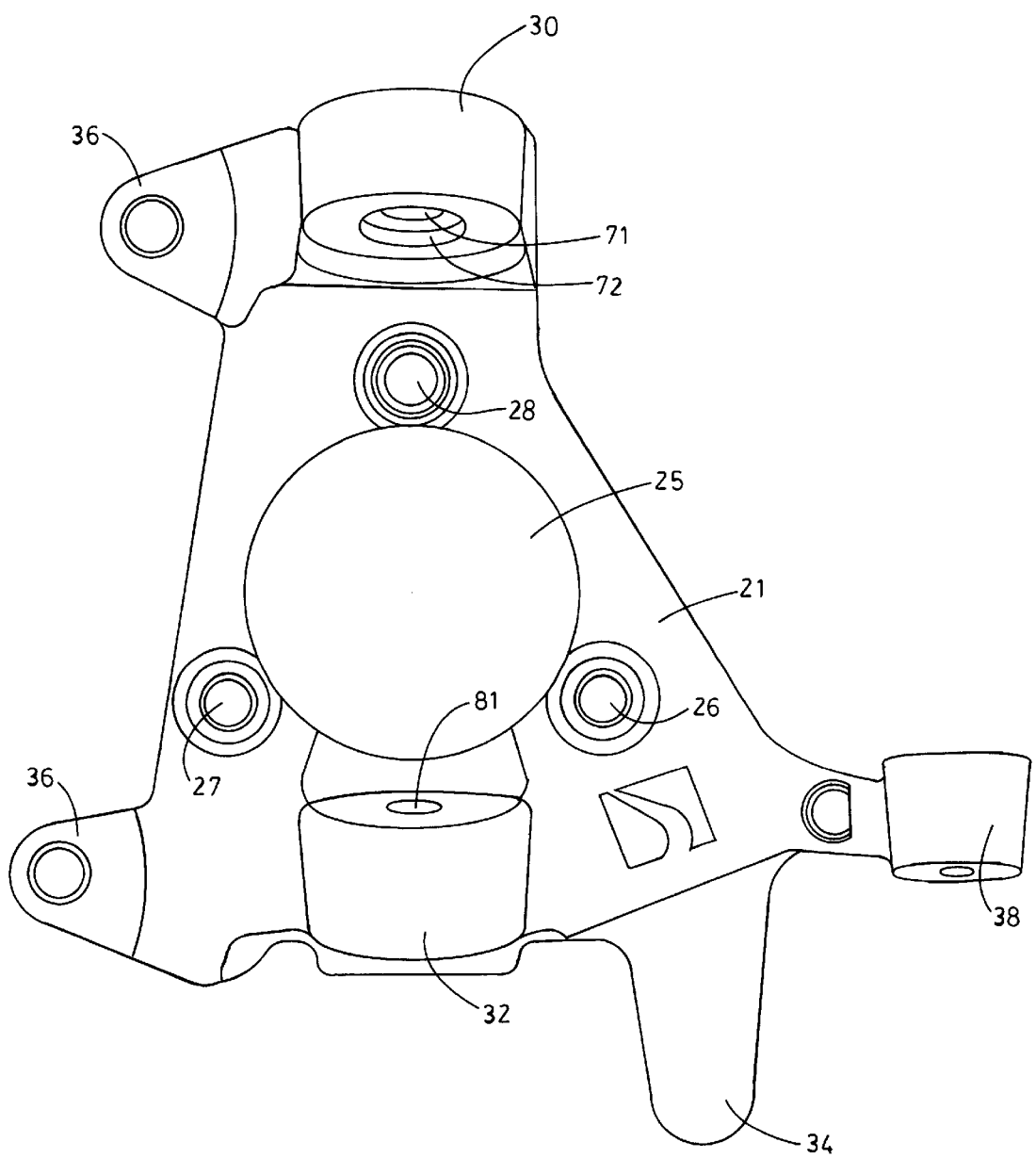
FIG. 3 is an inside perspective view of the steering knuckle body of the present invention showing the large bore and the bolt pattern for the wheel hub.
Figure 4:
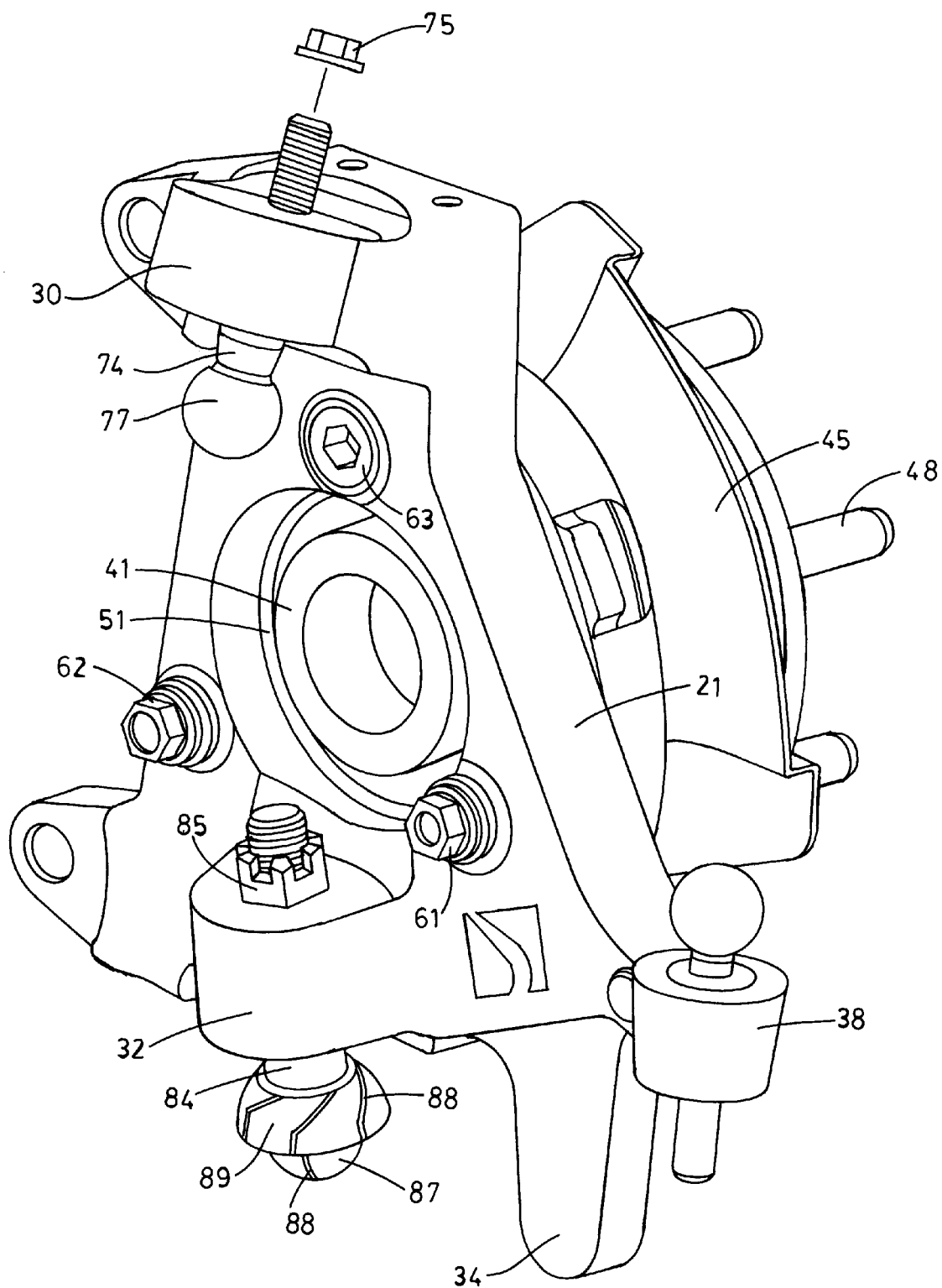
FIG. 4 is another inside isometric view of the steering knuckle body of the present invention attached to a "live" wheel hub, and including portions of the ball joints.

Referring to the drawings wherein like reference characters designate like or corresponding parts throughout the several views, and referring particularly to FIGS. 2 and 3, it is seen that the invention includes a steering knuckle having a cast body 21 with a large-diameter circular bore 25 centrally located therein for receiving a "live" wheel hub assembly 40. Hub assembly 40 is shown in isolation in FIG. 1, and installed in FIGS. 4–6. Assembly 40 includes a hub 42 integrally attached to a large-diameter axial spindle pin 41 and including an integral radial flange 45. A set of wheel studs 48 allow the flange portion 45 of hub 42 to be attached to a wheel of the vehicle. A cylindrical bearing housing 51 is provided as part of hub assembly 40 for holding spindle pin 41 in a freely rotational relationship. This rotation is accomplished through the use of a plurality of tapered roller bearing elements (not shown) located in the space between housing 51 and pin 41. Housing 51 includes a set of at least three external tabs 52, each tab including a threaded bore 53 for receiving attachment bolts 61, 62 and 63 which are used to attach housing 51 to a steering knuckle. While three such tabs and assemblies are illustrated in the drawings, it is understood that any additional external tab 52 would also include a bore 53 for receiving a bolt assembly for attachment to the steering knuckle.

The steering knuckle 21 of the present invention includes three bolt openings 26, 27 and 28 for receiving, respectively, bolt assemblies 61, 62 and 63. Openings 26 and 27 are designed to receive bolt assemblies 61 and 62 having a standard configuration; however, bolt opening 28 is counter bored, and corresponding bolt 63 is of a variety which may be flush mounted in order to provide clearance for the upper ball joint of the invention, as described more fully below.

Referring to FIGS. 2 and 3, it is seen that cast body 21 of the present invention includes an upper ball joint tab 30, a lower ball joint tab 32, a lower steering stop 34, a steering arm attachment tab 38, and a pair of tabs 36 with openings 37 therein for attachment of the brake caliper to the steering knuckle body.

Figure 6:
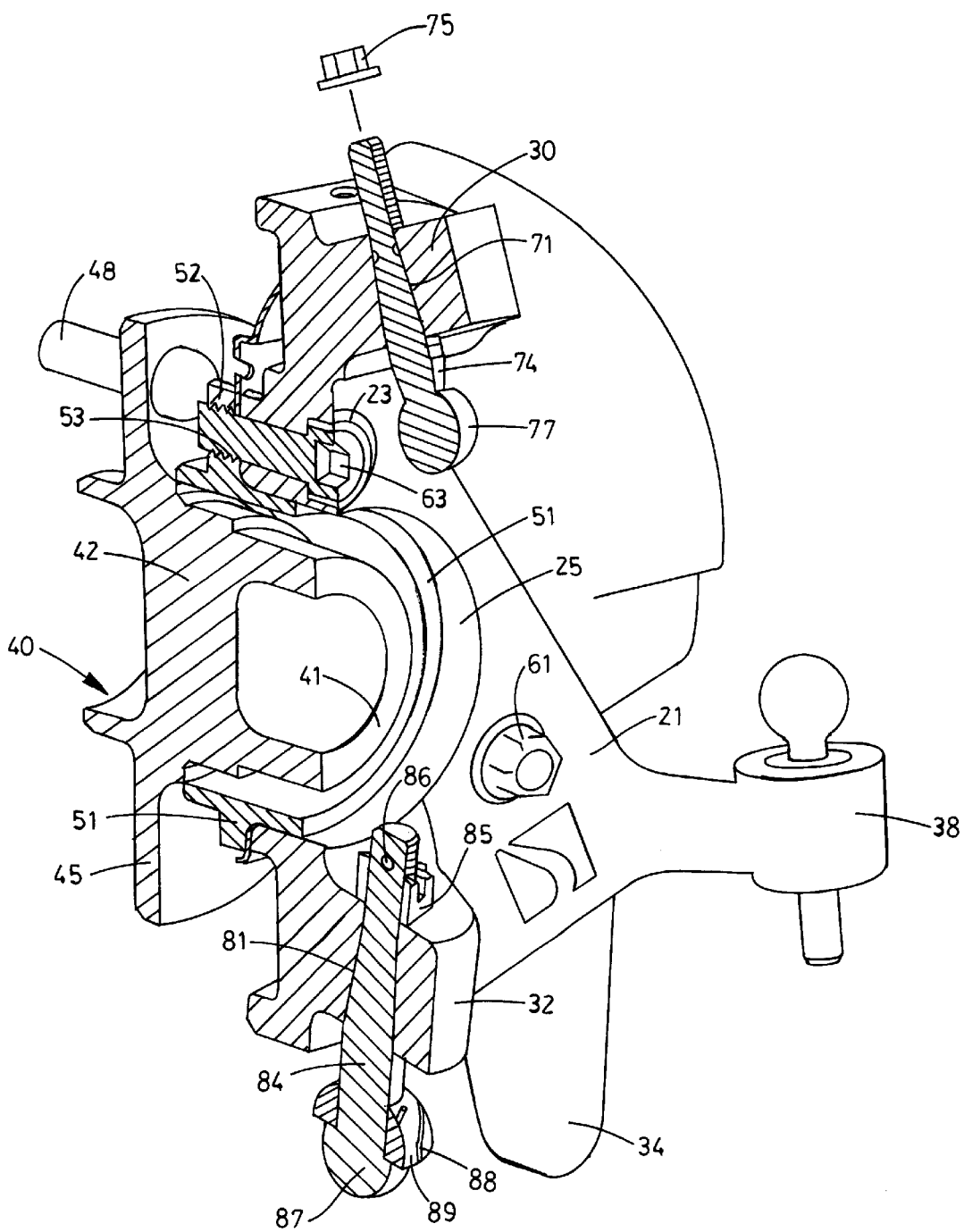
FIG. 6 is a partial section view of the steering knuckle body of the present invention, the "live" wheel hub, and portions of the ball joints.

Referring to the partially cut-away view of FIG. 6, it is seen that upper ball joint tab 30 is located at the top of the steering knuckle body 21, on the opposite side of bolt opening 28 from bore 25. Tab 30 does not protrude at a perpendicular 90° angle from the plane defined by the edge of bore 25, but instead is tilted upward at an obtuse angle for better clearance, the amount of the angle being determined by the orientation of the inverted upper control arm. This angular orientation allows the ball joint associated with this tab to be easily attached to the factory-supplied upper control arm 101 and to maintain a neutral ball joint position, with the upper control arm 101 inverted.

Upper tab 30 includes a tapered bore 71 therethrough that is wider at the bottom near bore 25 and narrower at the top. Bore 71 receives the stud 74 of the upper ball joint assembly. Stud 74 is also tapered to correspond to bore 71. The narrow end of stud 74 is provided with helical threads for engagement with a locking nut 75. A ball 77 is provided at the opposite end of stud 74 for engagement with a mating socket in the inverted upper control arm 101. The position of ball 77 protruding from upper tab 30 has been generally inverted from the corresponding structure on the factory steering knuckle shown in FIG. 14. The angular position of tab 30 and ball 77 facilitates easy attachment to the inverted factory-provided upper control arm.

Lower ball joint tab 32 is located at the bottom of the steering knucklebody 21, immediately below bore 25. Tab 32 also does not protrude at a perpendicular 90° angle from the plane defined by the edge of bore 25, but instead is tilted downward at an obtuse angle for better clearance, the amount of the angle being determined by the orientation of the lower control arm 103 and housing 102. This angular orientation allows the ball joint associated with this tab to be easily attached to a lower control arm housing 102 which, in turn, attaches to the factory-supplied lower control arm 103.

Lower tab 32 also includes a tapered bore 81 therethrough that is wider at the bottom end of the assembly, and more narrow at the top of tab 32 near bore 25. Bore 81 receives the stud 84 of the lower ball joint assembly. Stud 84 is also tapered to correspond to bore 81. The narrow end of stud 84 is provided with helical threads for engagement with a locking nut 85. It is preferred, but not necessary, that a hole 86 be provided on the helically threaded portion of stud 84 for receiving a cotter pin 98 (not shown), and that locking nut 85 be castellated in order to allow cotter pin 88 to be inserted in hole 86 of stud 84 to prevent locking nut 85 from unthreading. A dome or semi-sphere 87 is integrated into the opposite end of stud 84, and a removable hemisphere fitting 89 is provided adjacent to dome 87 for engagement with the lower ball joint housing 102. Semi-sphere 87 and hemisphere 89 are provided with a plurality of grooves 88 for receiving lubrication and reduce friction while moving inside housing 102.

Figure 7:
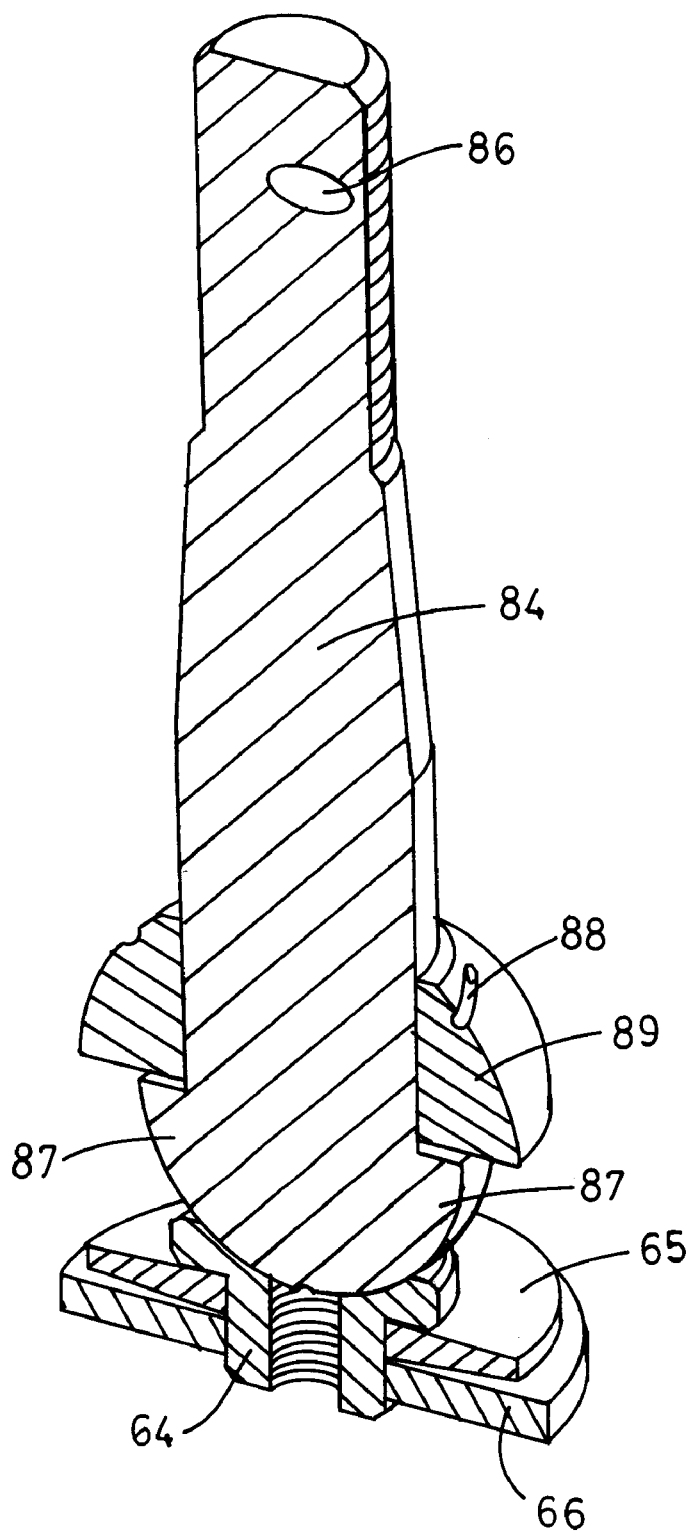
FIG. 7 is an isolated section view of the lower ball joint stud assembly.
Figure 8:
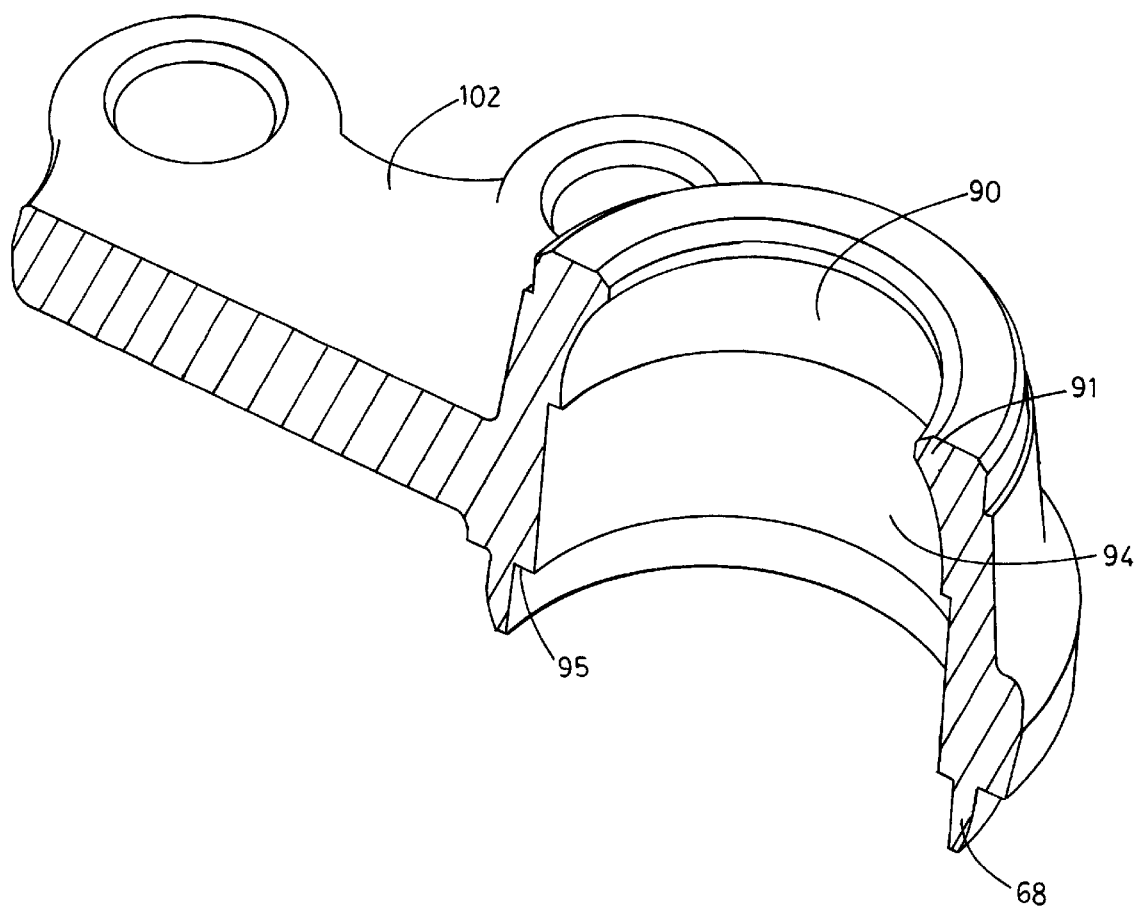
FIG. 8 is an isolated section view of the lower ball joint housing.
Figure 9:
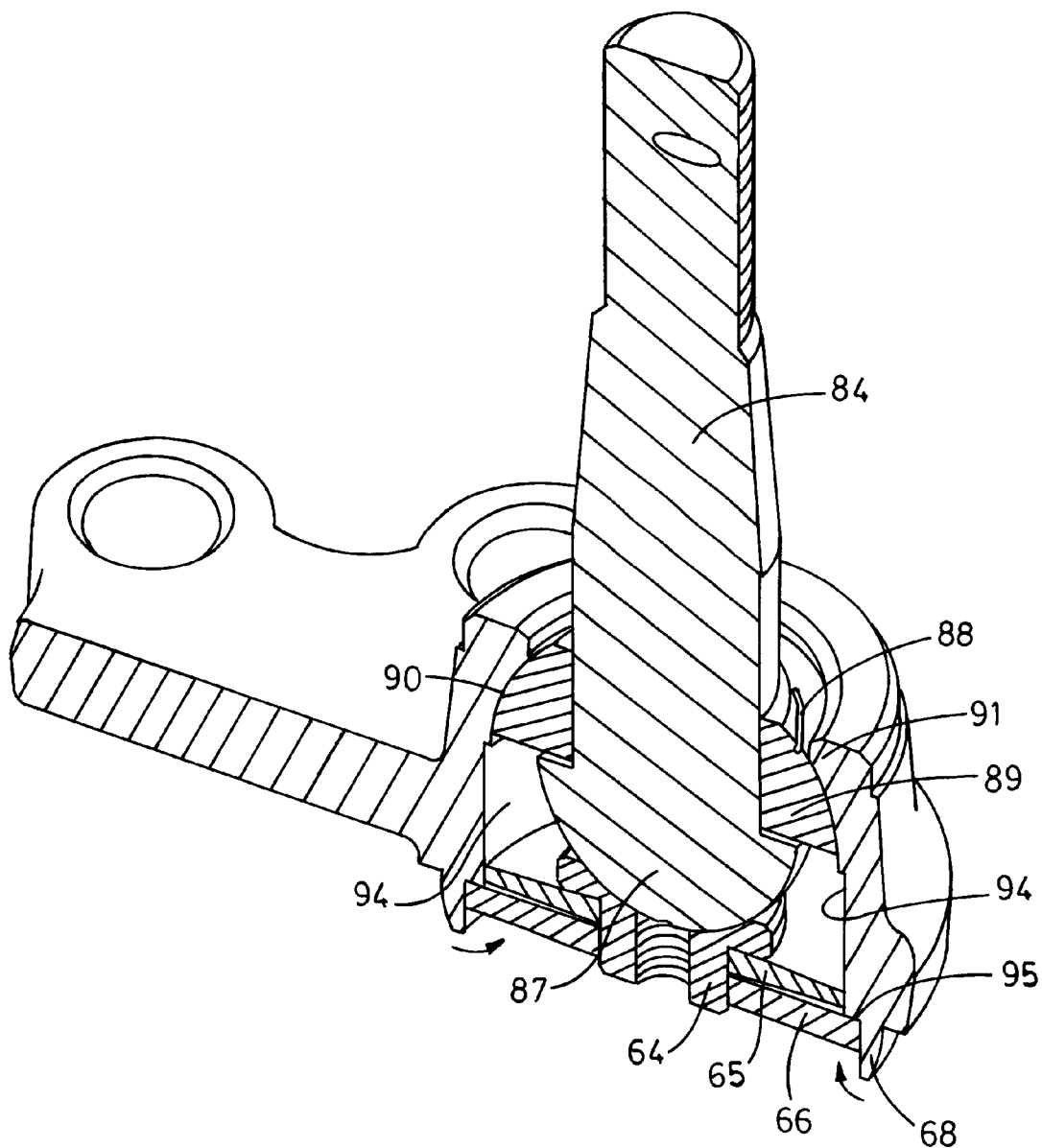
FIG. 9 is an isolated section view of the lower ball joint stud in the lower ball joint housing.
Figure 10:
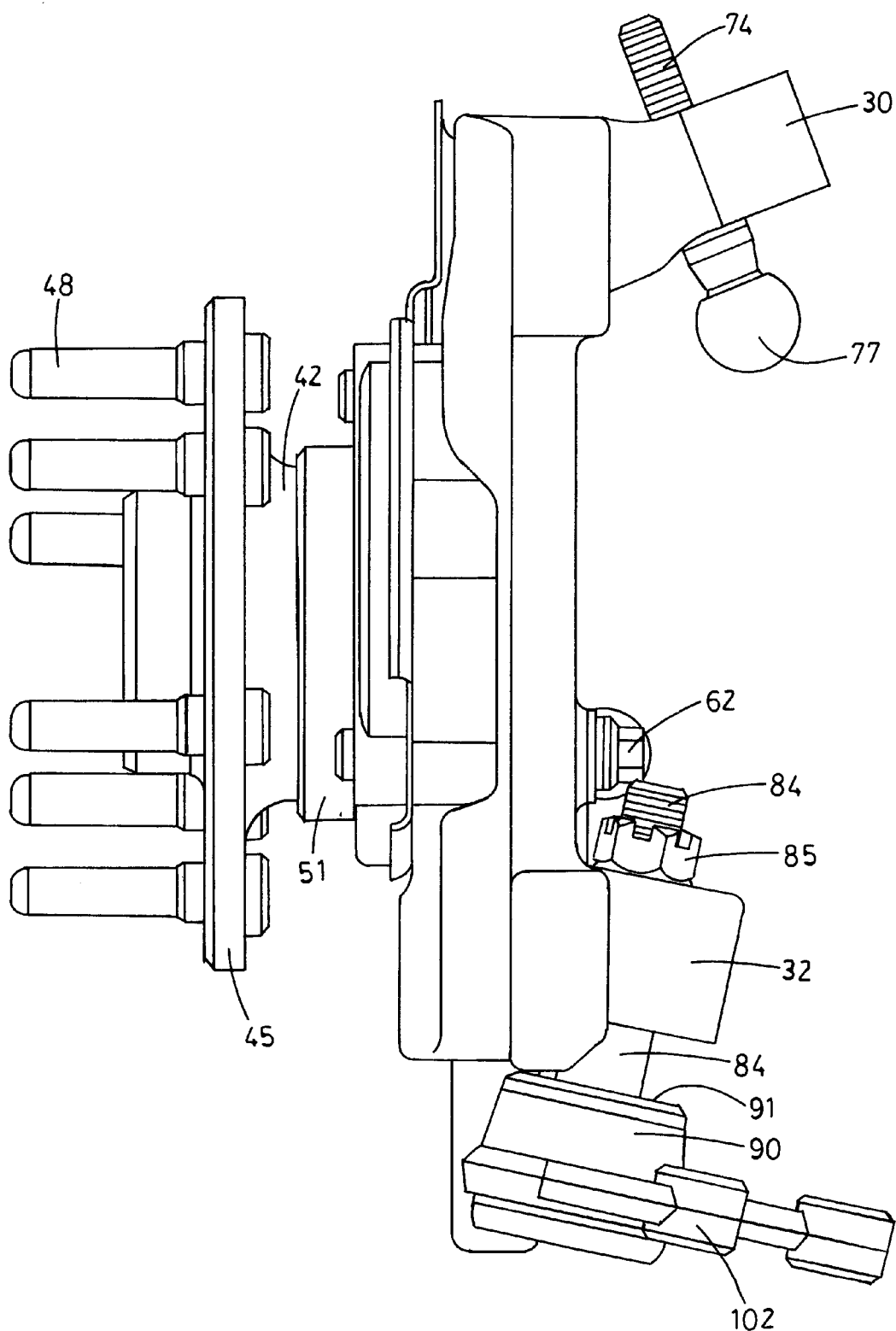
FIG. 10 is a rear perspective view of the present invention attached to a "live" wheel hub and lower ball joint housing.
Figure 11:
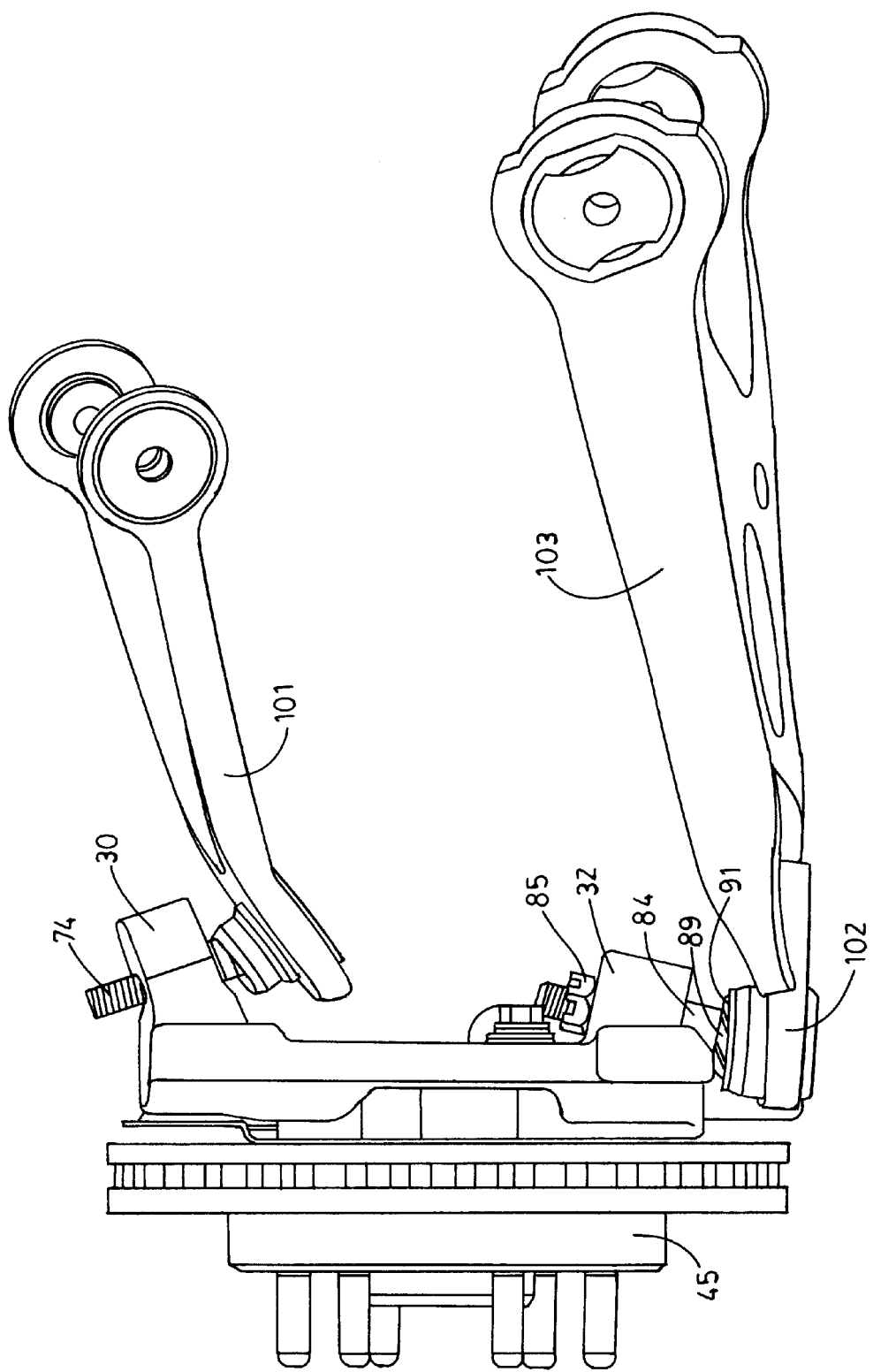
FIG. 11 is a rear view of the present invention attached to a "live" wheel hub and to the upper and lower control arm of a vehicle.
Figure 12:
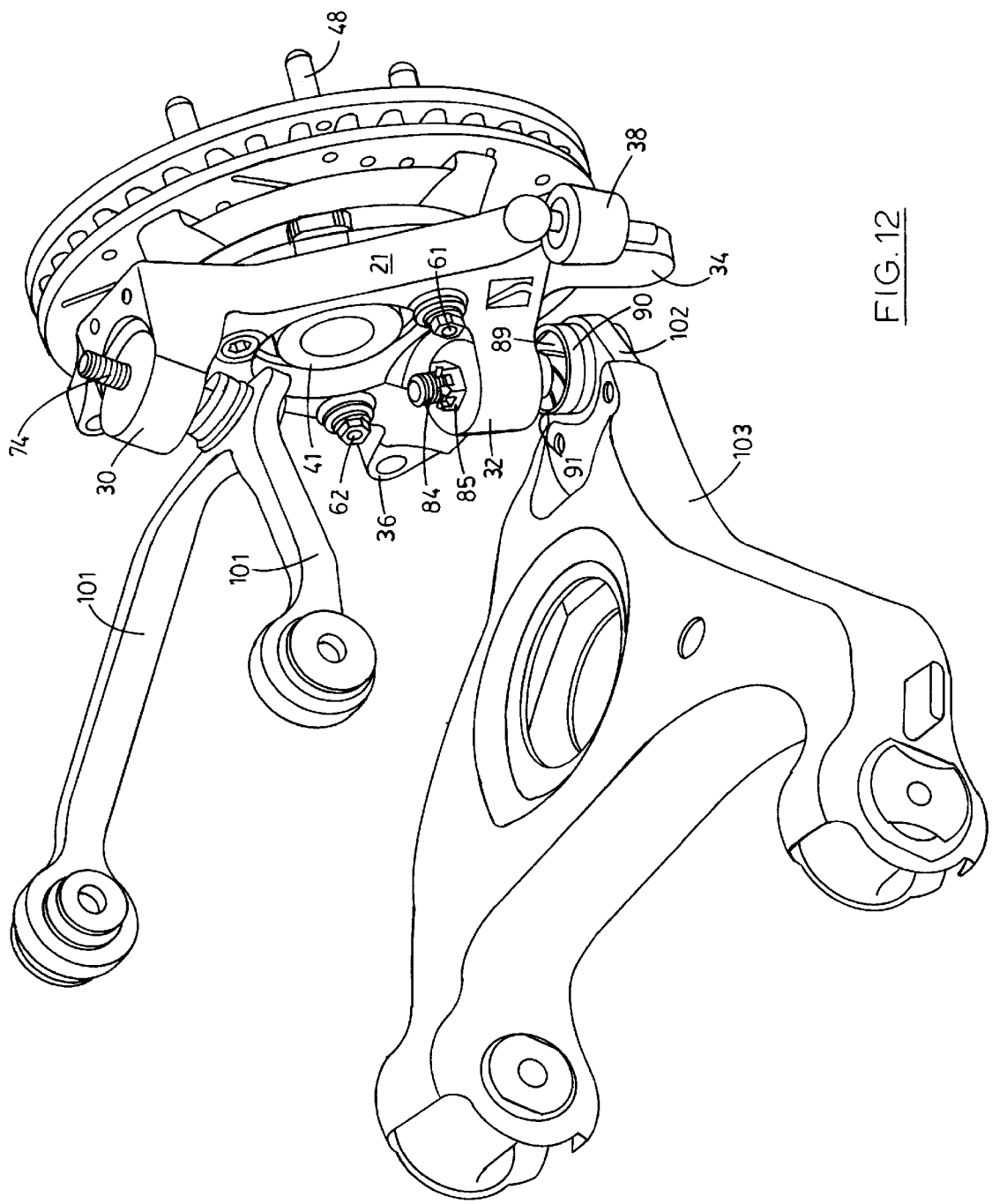
FIG. 12 is an isometric view of the present invention attached to a "live" wheel hub and to the upper and lower control arm of a vehicle.
Figure 13:
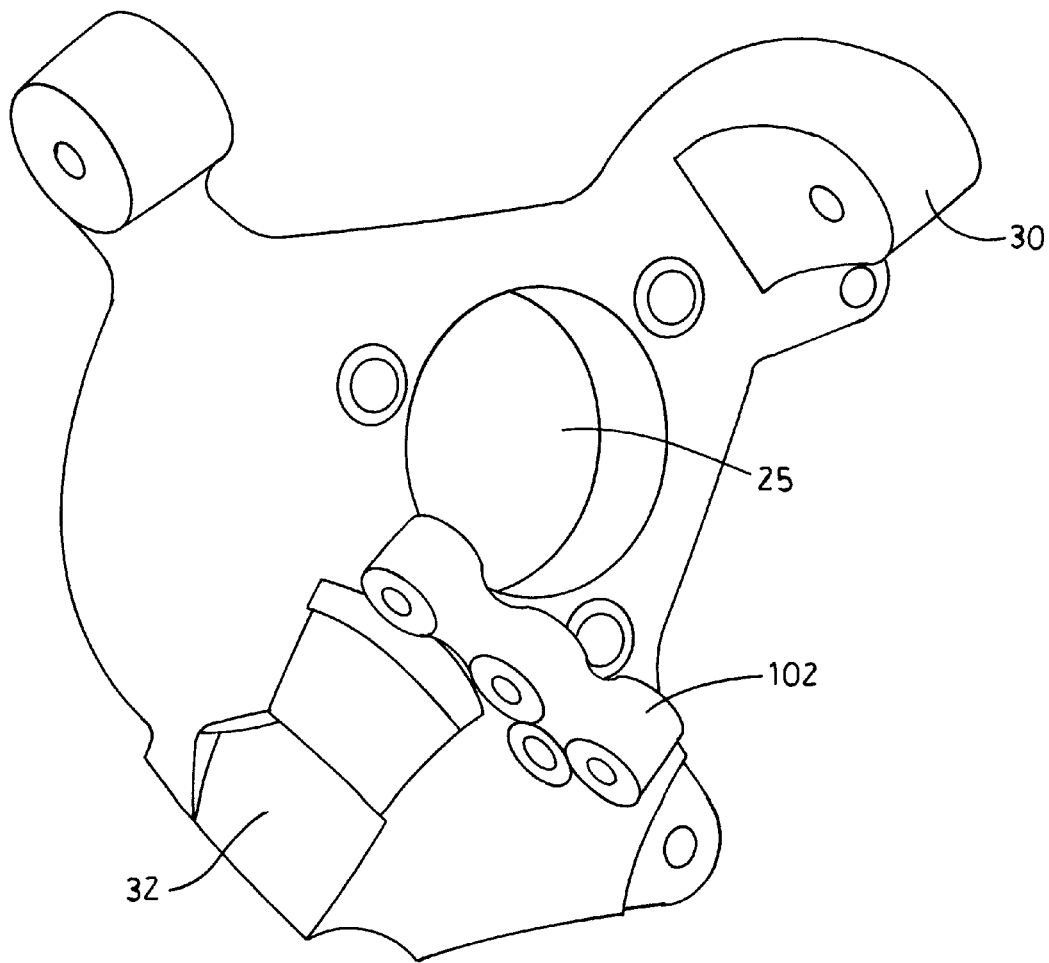
FIG. 13 is a perspective view of the factory steering knuckle.
Figure 14A:
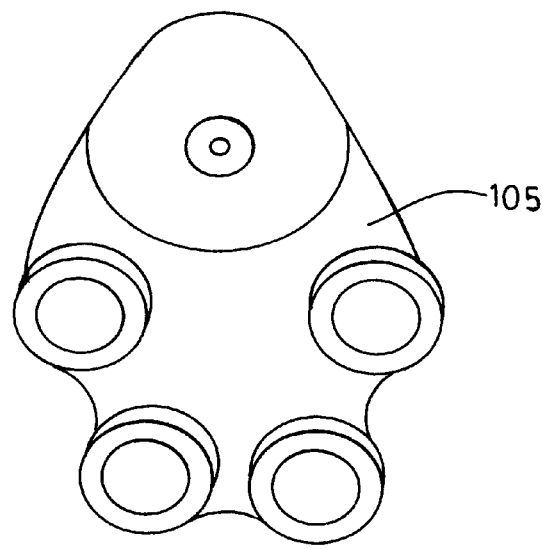
FIG. 14A is a perspective bottom view of the factory lower ball joint housing.
Figure 14B:
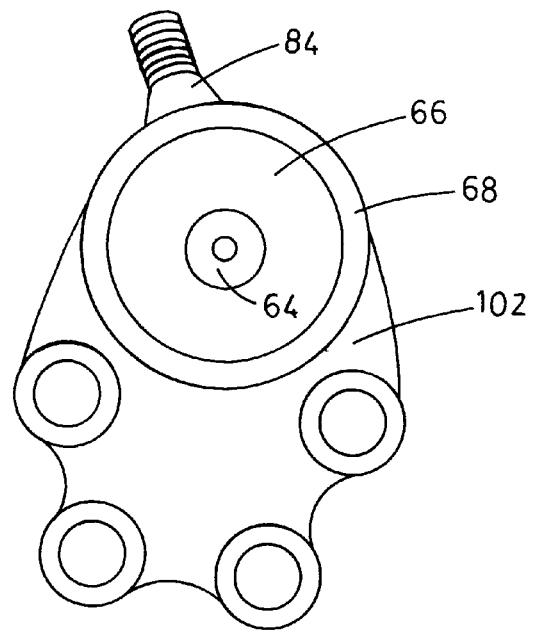
FIG. 14B is a perspective bottom view of the lower ball joint housing of the present invention.

Housing 102 is tension-based structure, and replaces the factory-provided compression-based structure 105 shown in FIG. 14A. Referring to FIG. 7–9, it seen that housing 102 includes a cup-shaped socket profile or pocket 90 is sized for slidably rotatable engagement with hemisphere 89. The upper end of socket 90 is provided with an annular upper lip 91 having an inside circumference defining an opening that is smaller than the outside circumference of hemisphere 89 (see FIGS. 8 and 9). A cup socket 64 having a dimpled upper flange surface is provided for supporting dome 87 in socket 90. Cup socket 64 includes a central bore with helical threads for receiving the head of a lubrication device (e.g. a Zack grease fitting) in order to fill well 94 below simi-sphere 87 with grease. A rubber washer 66 is provided immediately below the flange of cup socket 64. A steel retaining washer 66 is provided immediately below washer 65. Sandwiching the rubber washer 65, between cup socket 64 and semi-sphere end 87 of stud 84, are two (2) thin metal washers which, together rubber washer 65, apply upward pressure against cup socket 64, pushing said cup socket against semi-sphere 87 to take up wear. Retaining washer 66 is held in place between shoulder 95 on housing 102 and lower annular flange 68 which is rolled over below washer 66 in the direction of the arrows of FIG. 9 during ball joint assembly manufacture.

The weight of the vehicle is transferred through lower control arm 103 to the inside of socket 90 and lip 91 of housing 102, through hemisphere 89 to stud 84, through tab 32 to steering knuckle body 21, and finally to hub 40 and out to the vehicle wheel.

Figure 5:
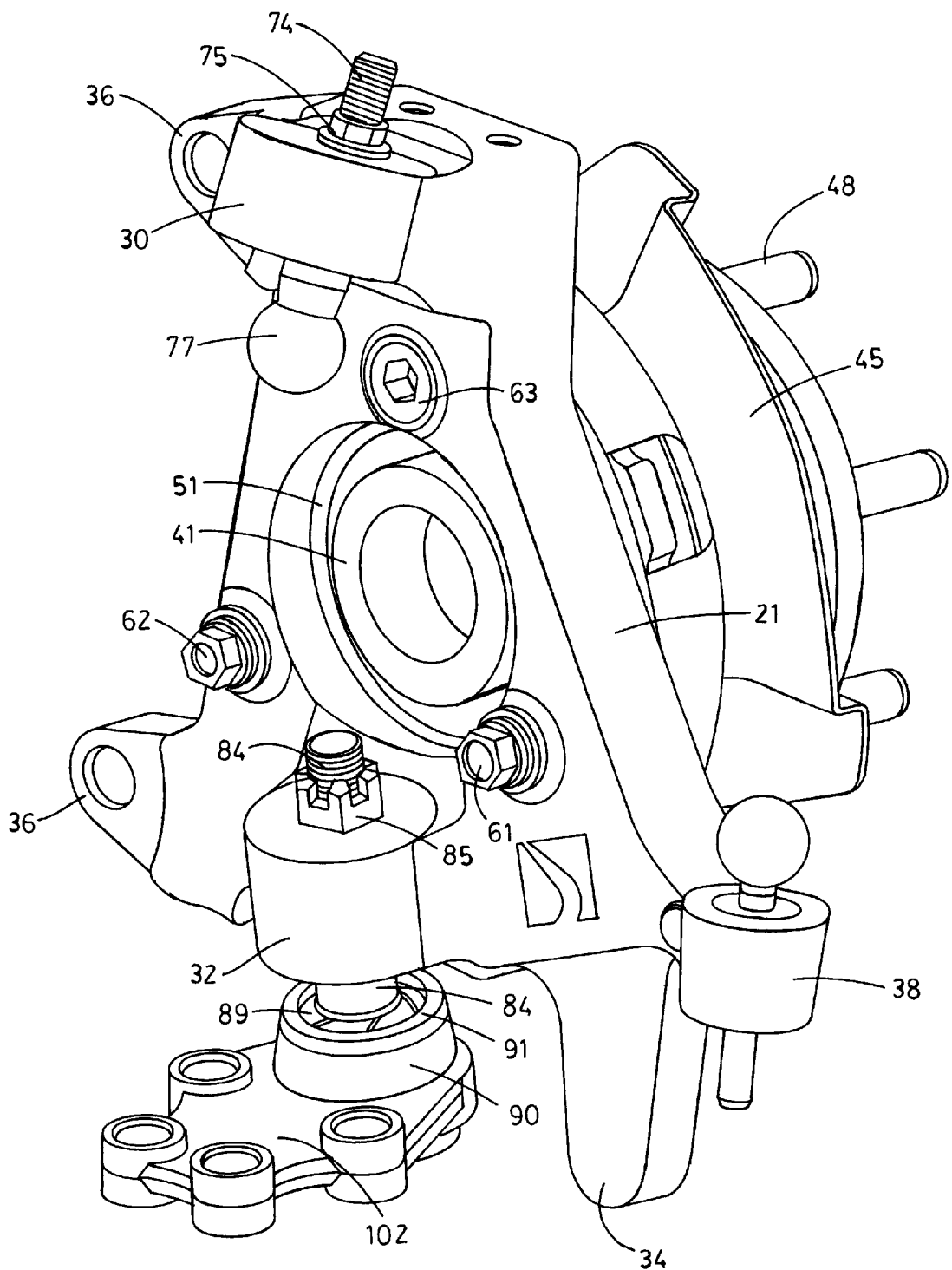
FIG. 5 is the view of FIG. 4 showing the attachment of the lower ball joint housing.

Connection of the lower ball joint housing 102 to the steering knuckle 21 is accomplished by first assembling the ball joint by inserting stud 84 into pocket 90 of housing 102 so that hemisphere 89 is held in place against the inside wall of socket 90 and lip 91, with the tapered end of stud 84 protruding out and away from lip 91 as shown in FIG. 9. The cup socket 64, rubber washer 65, spring washers, and metal washer 66 are placed below semi-sphere 87. Then annular flange 68 is crimped or folded around washer 66 to hold these parts in place. Lubrication may then be injected into well 94 through the bore in cup socket 64 so that it flows around semi-sphere 87 and hemisphere 89 and through grooves 88 to reduce friction and wear. The "ball" defined by semi-sphere 87 and hemisphere 89 is able to slidably move inside pocket 90, limited by the circumference of lip 91 encircling protruding stud 84, as shown in FIGS. 5 and 9. Once the ball joint is pre-assembled, the tapered end of stud 84 is then inserted into opening 81 on tab 32 from the bottom. Locking nut 85 is then threaded over the narrow, threaded end of stud 84 to hold the stud in place on tab 32. Nut 85 may be castellated, and a cotter pin hole 86 may be provided on stud 84, in which case a cotter pin 98 would be inserted through hole 86 to eliminate loosening of said nut.

The after-market steering knuckle of the present invention is designed to replace the factory-supplied steering knuckle, and allows the vehicle to be lowered closer to the ground. The present invention is designed to accept a "live" wheel hub assembly 40 which is far larger than a "dead" pin and hub assembly. The upper ball joint on the present invention has a position that is inverted as compared with the factory-provided steering knuckle. In accordance with the present invention, the position of the upper ball joint and support tab 30 is set at an appropriate angle in order to allow use of the factory-provided upper control arm 101, the difference being that control arm 101 is inverted when used with the present invention. Being able to use the factory-supplied upper control arm helps make use of the present invention more cost effective. By inverting the upper control arm in accordance with the inverted upper ball joint, the position of the vehicle chassis is lowered relative to the steering knuckle.

Similarly, the lower ball joint on the present invention is also inverted as compared with the factory-provided steering knuckle. The position of the lower ball joint and support tab 32 is set at an appropriate angle in order to allow attachment to a modified housing 102 which, in turn, attaches to the factory-provided lower control arm 103. As with the upper ball joint, being able to use the factory-supplied lower control arm helps make use of the present invention more cost effective. By inverting the lower ball joint and attaching the lower control arm to it using the modified housing 102, the position of the vehicle chassis is lowered relative to the steering knuckle.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. A vehicle-lowering steering knuckle comprising a body member having a large centrally located opening therein for receiving a wheel hub assembly, a plurality of bore holes located around said opening for use in attaching said wheel hub assembly to said body member, an upper ball joint support tab located above said opening for supporting an upper ball joint stud the ball of which is oriented below said upper tab, and a lower ball joint support tab located below said opening for supporting a lower ball joint stud the ball of which is oriented below said lower tab wherein said upper ball joint support tab includes a central tapered bore therethrough for receiving said upper ball joint stud, said bore being wider at the end near said large opening and more narrow at the opposite end, said stud being tapered to correspond to said tapered bore, said stud including a ball at its wider end and helical threads at its opposite end for engagement with a correspondingly threaded nut.

2. The steering knuckle of claim 1 wherein a bore hole located between said large opening and said upper ball joint support tab is counter-bored to provide space for the ball on said upper ball joint stud.

3. The steering knuckle of claim 1 wherein said upper ball joint support tab is tilted upward at an obtuse angle from the plane defined by the edge of said central opening.

4. The steering knuckle of claim 3 wherein a factory-supplied upper control arm may be inverted and attached to said upper ball joint.

5. The steering knuckle of claim 4 wherein said lower ball joint support tab includes a central tapered bore therethrough for receiving said lower ball joint stud, said bore being wider at the end away from said large opening and more narrow at the end nearer said opening, said lower stud being tapered to correspond to said lower tapered bore, said lower stud including a ball assembly at its wider end and helical threads at its opposite end for engagement with a correspondingly threaded lower nut.

6. The steering knuckle of claim 5 wherein said lower ball joint support tab is tilted downward at an obtuse angle from the plane defined by the edge of said central opening.

7. The steering knuckle of claim 5 wherein said lower nut is castellated, and a hole is provided through the threaded end of said lower stud for receiving a cotter pin.

8. The steering knuckle of claim 5 wherein a semi-sphere to form the ball of said lower ball joint.

9. The steering knuckle of claim 8 wherein a housing is provided for engagement with said downwardly facing lower ball joint, said housing including a pocket for rotatable engagement with said hemisphere, said pocket including an annular upper lip for holding said hemisphere inside said pocket.

10. The steering knuckle and housing of claim 9 wherein a plurality of grooves are provided in said hemisphere to allow lubrication to flow around said hemisphere inside said pocket.

11. The steering knuckle and housing of claim 10 wherein said pocket includes a lower retaining washer and an annular flange that is crimped around said washer to close the bottom of said pocket.

12. The steering knuckle and housing of claim 10 wherein said housing is attached to the factory-supplied lower control arm of the vehicle.

13. A vehicle-lowering steering knuckle assembly comprising a body member having an enlarged centrally located opening therein for receiving a wheel hub assembly, an upper ball joint support tab located above said opening for supporting an upper control arm ball joint stud in an inverted position, and a lower ball joint support tab located below said opening for supporting a lower control arm ball joint stud in an inverted position wherein said upper ball joint support tab includes a central tapered bore therethrough for receiving said upper ball joint stud, said bore being wider at the end near said opening and more narrow at the opposite end said stud being tapered to correspond to said tapered bore.

14. The assembly of claim 13 wherein a plurality of bore holes are provided on said body member around said opening for use in attaching said wheel hub assembly there to, one such bore hole being located in the vicinity of said upper ball joint support tab, said bore hole being counter-bored to provide space for the ball of said upper control arm ball joint stud.

15. In a vehicle of a type having a live wheel hub and upper and lower control arms, each control arm having a ball joint and stud at one end thereof, a steering knuckle assembly for lowering the height of said vehicle comprising a body member having an enlarged centrally located opening therein for receiving said hub, a first support tab located above said opening for supporting the stud of said upper control arm ball joint in an inverted position, and a second support tab located below said opening for supporting the stud of said lower control arm ball joint in an inverted position wherein a lower ball joint assembly is provided for attachment to said lower control arm, said assembly having a lower control arm ball joint stud that is in an inverted position.

16. The steering knuckle assembly of claim 15 wherein a plurality of bore holes are provided on said body member around said opening for use in attaching said wheel hub thereto, one such bore hole being located in the vicinity of said first support tab, said bore hole being counter-bored to provide space for the ball of said upper control arm ball joint stud.

17. The steering knuckle assembly of claim 16 wherein said first support tab includes a central tapered bore therethrough for receiving said upper ball joint stud, said bore being wider at the end near said opening and more narrow at the opposite end, said stud being tapered to correspond to said tapered bore.

18. The steering knuckle assembly of claim 17 wherein said first support tab is tilted upward at an obtuse angle from the plane defined by the edge of said opening.

19. In combination, a steering knuckle for lowering the height of a vehicle, and factory-provided upper and lower control arm with ball joints and studs for a wheel assembly of said vehicle, said steering knuckle comprising a body member having an enlarged centrally located opening therein for receiving a wheel hub, a first support tab located above said opening for supporting the stud of said upper control arm ball joint in an inverted position, a second support tab located below said opening for supporting the stud of said lower control arm ball joint stud therein that is in an inverted position wherein said upper control arm is inverted prior to the engagement of said upper stud with said first support tab, and said lower control arm assembly is attached to said lower control arm for engagement with said second tab.

20. The combination of claim 22 wherein said first support tab includes a central tapered bore therethrough for receiving said stud, said bore being wider at the end near said opening and more narrow at the opposite end, said stud being tapered to correspond to said tapered bore.

21. The combination of claim 20 wherein said upper stud includes a ball at its wider end and helical threads at its opposite end for engagement with a correspondingly threaded nut.

22. The combination of claim 20 wherein said first support tab is tilted upward at an obtuse angle from the plane defined by the edge of said opening.

23. A method for lowering the height of a wheel of a vehicle having a live wheel hub comprising the steps of:
 a. removing the wheel assembly of said wheel;
 b. detaching one end of the upper and lower control arms from the factory-supplied steering knuckle support tabs;
 c. detaching the live wheel hub from the factory-supplied steering knuckle;
 d. removing the factory-supplied steering knuckle from the vehicle;
 e. detaching the opposite end of the upper control arm from the vehicle chassis, inventing said upper control arm, and reattaching said opposite end to said frame in an inverted position;
 f. detaching the factory-supplied lower ball joint assembly from the lower control arm;
 g. attaching a lower ball joint assembly to the detached end of the control arm, said assembly having a lower control arm ball joint stud therein that is in an inverted position;
 h. installing a new steering knuckle having a body with an enlarged centrally located opening therein for receiving said live wheel hub assembly, an upper ball joint support tab located above said opening for supporting the upper ball joint stud in an inverted position, and a lower ball joint support tab located below said opening for supporting the lower ball joint stud in an inverted position by attaching the inverted ball joint studs on the ends of said upper and lower control arms, respectively to the upper and lower support tabs of said new steering knuckle; and
 i. reinstalling the wheel assembly.

24. A method for lowering the height of a wheel of a vehicle of a type having a live wheel hubs a factory-supplied steering knuckle and factory-supplied upper and lower control arms, each control arm having a ball joint and stud at one end thereof comprising the steps of:
 a removing the factory-supplied steering knuckle;
 b. detaching the factory-supplied upper control arm from vehicle chassis;
 c. inverting said upper control arm;
 d. reattaching said upper control arm to vehicle chassis in an inverted position;
 e. detaching the factory-supplied lower ball joint assembly from the lower control arm;
 f. attaching a lower ball joint assembly to tie lower control arm, said assembly having a lower control arm ball joint stud therein that is in au inverted position;
 g. installing a new steering knuckle having a body with an enlarged centrally located opening therein for receiving said live wheel hub assembly, an upper ball joint support tab located above said opening for supporting the upper ball joint stud in an inverted position, and a lower ball joint support tab located below said opening for supporting the lower ball joint stud in an inverted position, by attaching the inverted ball joint studs on the end of said upper and lower control arms, respectively, to the upper and lower support tabs of said new steering knuckle.

\* \* \* \* \*